United States Patent [19]

Masaaki

[11] Patent Number: 4,524,977
[45] Date of Patent: Jun. 25, 1985

[54] UNDERWATER BEARING PROTECTION DEVICE

[76] Inventor: Nagashima Masaaki, 272-Oyama, Chiba-ken, Japan, 271

[21] Appl. No.: 559,206

[22] Filed: Dec. 8, 1983

[51] Int. Cl.³ .............................................. F16J 15/40
[52] U.S. Cl. ................................... 277/3; 277/DIG. 8
[58] Field of Search ................... 277/DIG. 8, 135, 59, 277/3

[56] References Cited

U.S. PATENT DOCUMENTS

| | | | |
|---|---|---|---|
| 3,876,254 | 8/1975 | Parker | 277/DIG. 8 |
| 4,294,454 | 10/1981 | Cannings | 277/DIG. 8 |
| 4,412,683 | 11/1983 | Haney | 277/3 |
| 4,428,584 | 1/1984 | Shapiro | 277/3 |
| 4,475,577 | 10/1984 | Cubalachini | 277/3 |
| 4,486,024 | 12/1984 | Cooper | 277/3 |

Primary Examiner—Robert I. Smith
Attorney, Agent, or Firm—Burgess, Ryan & Wayne

[57] ABSTRACT

A collar or collars are opposed to a hub and a sealing member or seal members are mounted on the opposed portions of the collars and the hub. A bushing is attached between the hub and a shaft or the hub and the collars and a ring-like hole to which clean water is supplied is formed inside the hub and bushing. A bearing portion between the bushing and the shaft or the cylinder portion is lubricated by the clean water. Also, the clean water is supplied to a clean water pressure portion between the hub, the collar and the seal member and the invasion of sand and mire to the bearing may be prevented.

21 Claims, 13 Drawing Figures

UNDERWATER BEARING PROTECTION DEVICE

BACKGROUND OF THE INVENTION

The present invention relates to an underwater bearing protection device for preventing rapid abrasion of the bearings in equipment for removing sand in a cleaning bed of a filtration plant or for using in the settling basins, in which sand, sewage, etc. are deposited, in drainage disposal plants, sewage disposal plants or paper manufacturing.

Conventional underwater bearings of sewage scrapers, disposing sand scraping lifters, agitators, pump, etc. are remarkably worn by the invasion of sand and mire.

For removing this defect, the applicant of this application proposed an underwater bearing protection device in which a bushing is rotatably mounted on a sleeve attached to a fixed shaft, a hub is fixed on the bushing, both sides of the hub are covered by outer edges of collars, the inner edges of which are respectively fixed on the bushing, O rings are mounted between the both edges of hub and the outer edges of the collars, the flange of a chain wheel is fixed on the hub and thus, the flange, the hub and the bushing are rotated (see Japanese Patent Publication No. 54653/82).

In the underwater bearing protection device, for preventing the invasion of sand and mire from the portions of the O rings between the outer edges of the collars and the both sides of hub due to the rotation of the flange, clean water is passed into the center water supplying passage which is provided with the center of the fixed shaft through the water pipe which is attached on the fixed shaft. This is supplied to a ring-like hole which is provided with the bushing and hub from the the center water supplying passage through the sleeve and flows from inclined water supplying passages through the ring-like hole to the outside edges.

However, in order that the inclined water supplying passages are opened at constant interval in the peripheries of that both sides of the hub near the gaps between the both edges of the hub and the the outside edges of the collars, the clean water may be equally caused to flow to the outer side edges of the collars. Therefore, when many foreign materials such as floating sand and so on are deposited in a cleaning bed, there is the problem that this sealing effect is not sufficient.

SUMMARY OF THE INVENTION

The object of the present invention is therefore to provide an underwater bearing protection device to prevent the sand and mire floating underwater from approaching gaps between the both edges of the hub and the outside edges of the collars.

The other object of the present invention is to provide an underwater bearing protection device in which seal members are respectively provided with the outside edges of the collars and the peripheries of the hub near the outside edges, clean water pressure portions are formed in the seal members by gushing clean water, and when the clean water is stopped, such foreign materials as sand and mire floating underwater do not enter into the seal members.

The constitution of the present invention for attaining the above objects comprises a fixed shaft, a sleeve attached on the said fixed shaft, a bushing rotatably mounted on the periphery of said sleeve, collars having inside edges attached on said sleeve and outside edges respectively covering the both sides of said hub, and seal members having bases attached on the both edges of said hub or the ouside edges of said collars and lips respectively contacting to the ouside edges of said collars or the both edges of the hub, whereby clean water is supplied to a ring-like hole formed in the bushing and the hub through a center water supplying passage formed in the center of said fixed shaft and a water passage of said sleeve from a water pipe attached outside said fixed shaft and is supplied to clean water pressure portions between said seal members and the both edges of the hub and said outside edges of said collars through water passages formed in the hub or gaps between said sleeve and said bushing and between said collars and bushing from said ring-like hole.

BRIEF DESCRIPTION OF THE DRAWINGS

FIGS. 3($a$) and 3($b$) are sectional views of seal members.

DESCRIPTION OF THE PREFERRED EMBODIMENTS

Figure 1:
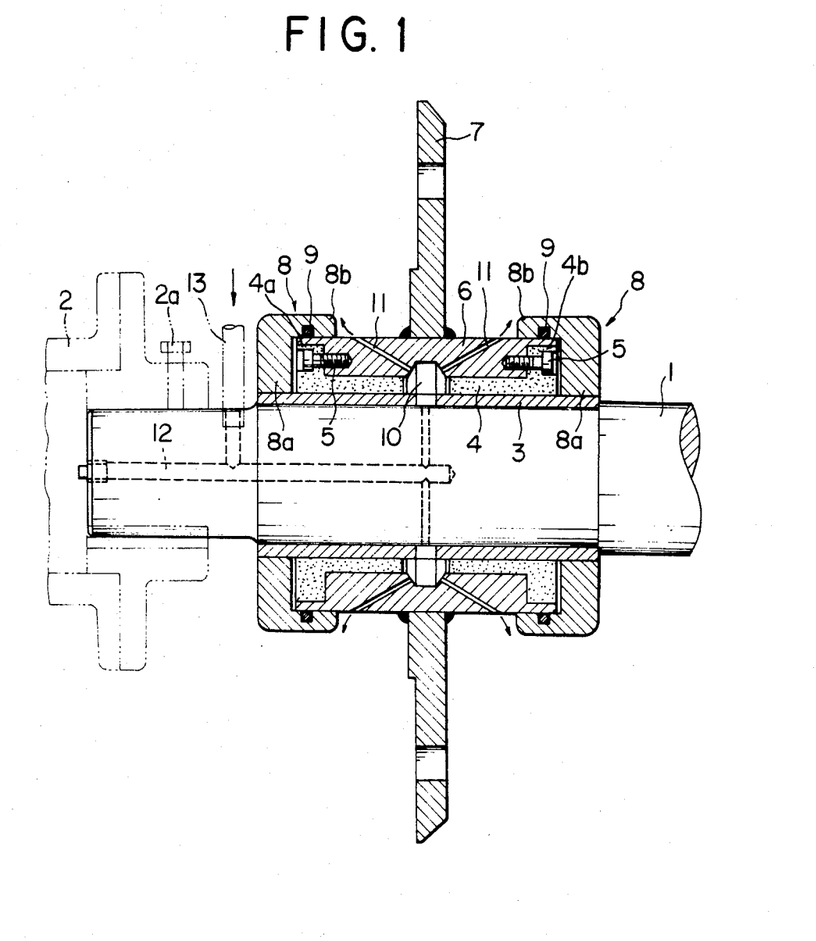
FIG. 1 is a sectional view of an under-water bearing protection device proposed by the present applicant.

Prior to the description of the preferred embodiments of the present invention, the prior art will be described briefly in order to explain its underlying principle and to specifically point out the defect thereof. In FIG. 1, a fixed shaft 1 is attached to a shaft coupling 2 by a screw 2$a$ as shown by dotted lines. A sleeve 3 is attached the fixed shaft 1 and a bushing 4 is rotatably mounted the sleeve 3 and is divided into two sections. A hub 6 is held between the protrusions 4$a$ and 4$b$ of the section of the bushing 4 and is fixed by two screws 5. A flange 7 of a chain wheel is fixed on the outer face of the hub by welding. Collars 8 covers both sides of the hub 6 and the inner edges 8$a$ are fixed to the sleeve 3, the outside edges 8$b$ of the collars 8 are covered by both outsides of the hub 6 and O ring 9 is provided between the outside edges 8b of the collars 8 and the both edges of the hub 6. A ring-like hole 10 is formed between the sections of the bushing 4 and is hollowed with respect to one portion of the hub 7. A plurality of inclined water supplying passage 11 are obliquely formed in the hub 6 and are turned direct the outside edges 8b. A center water supplying passage 12 is formed in the center of the fixed shaft 1 and is connected to the ring-like hole 10. The center water supplying passage 12 has a water supplying passage hole connected to a water pipe 13.

In the underwater bearing protection device as shown in FIG. 1, when the flange 7 is rotated, in order to prevent sand and mire from invading the portion of the O rings 9 from the gaps between the outside edges 8b of collars 8 and the outside of the hub 6, the sand and mire approaching the outside edges 8b are blown off by gushing clean water to the outside edges 8b of the collar 8 from the inclined water supplying passages 11 through the center water supplying passage 12 of the fixed shaft 1 and the ring-like hole 10 from the water pipe 13, and the invasion of the wire and sand from the ring-like gaps between the outside of the hub and the outside edges of collars-is prevented.

However, in order that the inclined water supplying passages 11 are provided with the outer edges of the hub 6 at constant intervals, the sealing effect of the inclined water supplying passage 11 is insufficient.

Figure 2:
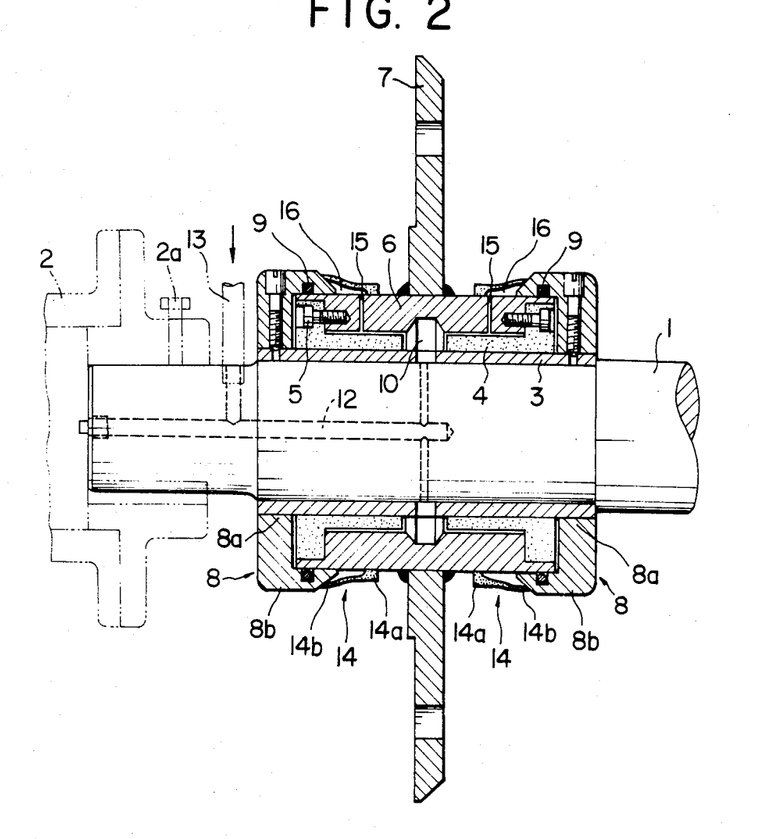
FIG. 2 is a sectional view of an underwater bearing protection device of the first embodiment according to the present invention.

FIG. 2 shows a sectional view of the first embodiment of an underwater bearing protection device of the present invention. In FIG. 2, 1 denotes a fixed shaft, 2 a shaft coupling, 3 a sleeve, 4 a bushing, 5 screws, 6 a hub, 7 a flange, 8 the collars, 9 the O rings, 10 a ring-like hole, 12 a center water supplying passage and 13 a water pipe, and since the same numerals denote similar parts as in FIG. 2, a detailed explanation of these constitutions is omitted. In the present embodiment, the bases 14a of seal members 14 are fixed on the outer face of the hub 6 and the lips 14b of the seal members 14 are contacted with the outside edges 8b of the collars 8. Clean water is supplied to the clean water pressure portions 16 surrounded by the seal members 14 from the ring-like hole 10 through water passages 15. The collars 8 are fixed to the sleeve 3 by screws 18.

In the underwater bearing protection device, since the clean water pressure portions 16 are formed between the seal members 14, the outer faces of the hub 7 and the outside edges 8b of the collars 8, when clean water is sent, the clean water pressure portions 16 through the center water supplying passage 12 the ring-like hole 10 and the water supply passages 15 from the water pipe 13, the lips 14b of the seal members 14 are opened by water pressure, and the clean water is gushed from the clean water pressure portions 16 to the periphery of the outside edges 8b of the collars 8 and flows in the radial direction of the collars 8. Therefore, the sand and mire near the seal members 14 and collars 8 are blown away by the gushing water.

On the other hand, when the pressure of the clean water in the clean water pressure portions 16 is lowered by the damage and the stopping of the pump for supplying clean water, since the pressure of the dispersed water in the cleaning bed acts from outside to inside of the seal members 14 and the lips 14b of the seal members 14 are pressed to the outside edges 8b of the collar 8, the invasion of the sand and mire into the bearing is prevented.

Figure 3A:
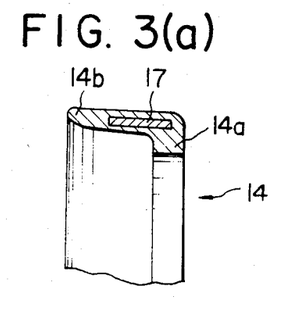
Figure 3B:
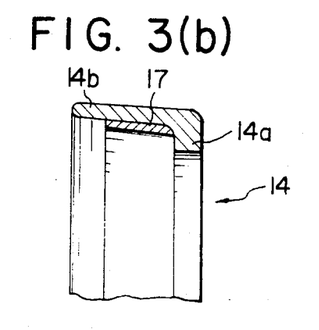

The seal members 14 are made of resilient material such as rubber or plastic. As shown in FIG. 3(a), the reinforcement material 17 is buried in the seal material 14 and as shown in FIG. 3(b), a reinforcement material 17 is attached to the one side of the seal material 14.

Figure 4:
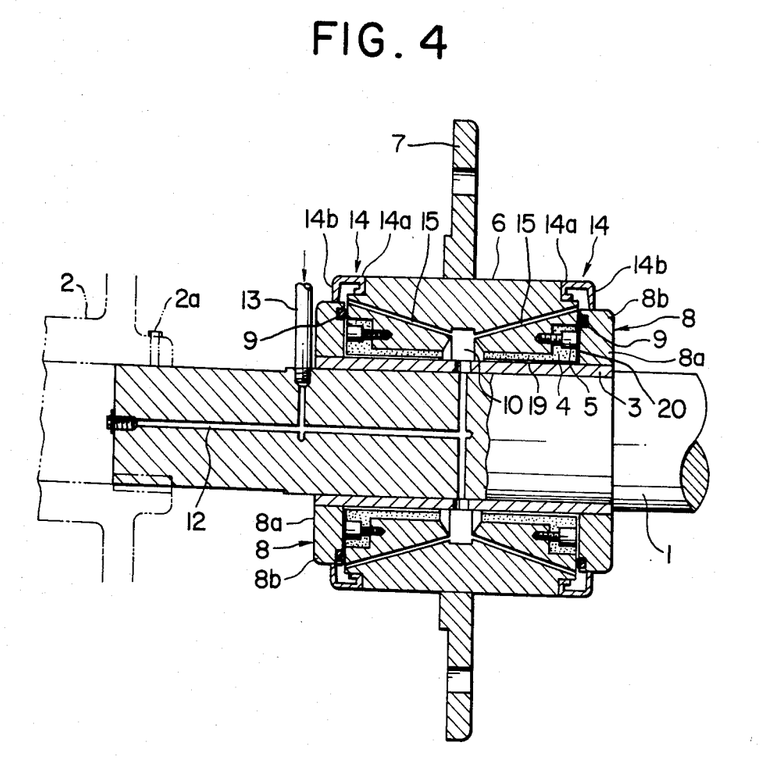
FIG. 4 is a sectional view of an underwater bearing protection device of the second embodiment according to the present invention.

FIG. 4 shows a sectional view of the second embodiment of an underwater bearing protection device of the present invention. In FIG. 4, 1 denotes a fixed shaft, 2 a shaft coupling, 2a screws, 3 a sleeve, 4 a bushing, 5 screws, 6 a hub, 7 a flange, 8 collars, 9 the O rings, 10 a ring-like hole, 12 a center water supplying passage, 13 a water pipe, 14 seal members, 15 water supply passages, 16 clean water pressure portions and since the same numerals denote similar parts as in FIG. 2, the detail explanation of these elements is omitted. In the embodiment, a gap 19 is formed between the sleeve 3 and the bushing 4 and gaps 20 are formed between the collars 8 and the sides of the bush 4 and the sides of the hub 6. Clean water flows in the peripheries of the O ring 9 mounted between the outside edge 8b of the collars 8 and the both sides of the hub 6 through the gaps 19 and 20 from the ring-like hole 10.

The embodiment of FIG. 4 has collars or flanges 8 with a diameter equal to or less than the diameter of the hub 6, but is otherwise similar to the embodiment shown in FIG. 2. In this embodiment, the fluid seals are formed in the gaps 20 between the collars 8 and the sides of the hub 6 and the bushing 4 and in the gap 19 between the bushing 4 and the sleeve 3, and the clean water pressure portions 16 are formed by the seal members 14, and thus, the invasion of the sand and mire is prevented. In the embodiment of FIG. 4, because the diameters of the collars or flanges 8 are the same as or less than the diameter of the hub 8, the whole of the underwater bearing protection device may be made more compact.

Figure 5:
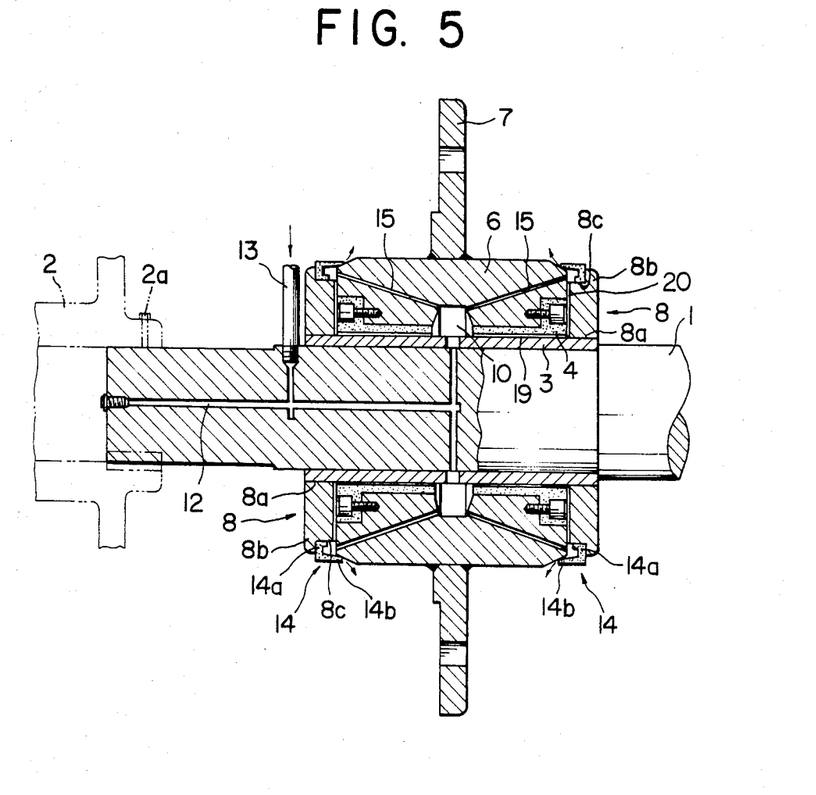
FIG. 5 is a sectional view of an underwater bearing protection device of the third embodiment according to the present invention.

FIG. 5 shows a sectional view of the third embodiment of an underwater bearing protection device of the present invention. In FIG. 5, 1 denotes a fixed shaft, 2 a shaft coupling, 3 a sleeve, 4 a bush, 5 a screws, 6 a hub, 7 a flange, 8 collars, 10 a ring-like hole, 12 a center water supplying passage, 13 a water pipe, 14 seal members, 15 water supply passages, 16 clean water pressure portions and 19 and 20 gaps and since the same numerals denote similar parts as in FIG. 4, a detailed explanation of these elements is omitted. In the present embodiment, the diameter of the collar 8 is same as or smaller than the hub 6 and the O ring 9 is omitted. The bases 14a of the seal members 14 are respectively fixed to the step portions 8c of the collars 8 and the lips 14b of the seal members 14 are contacted with the outside portions of the hub 6.

Figure 6:
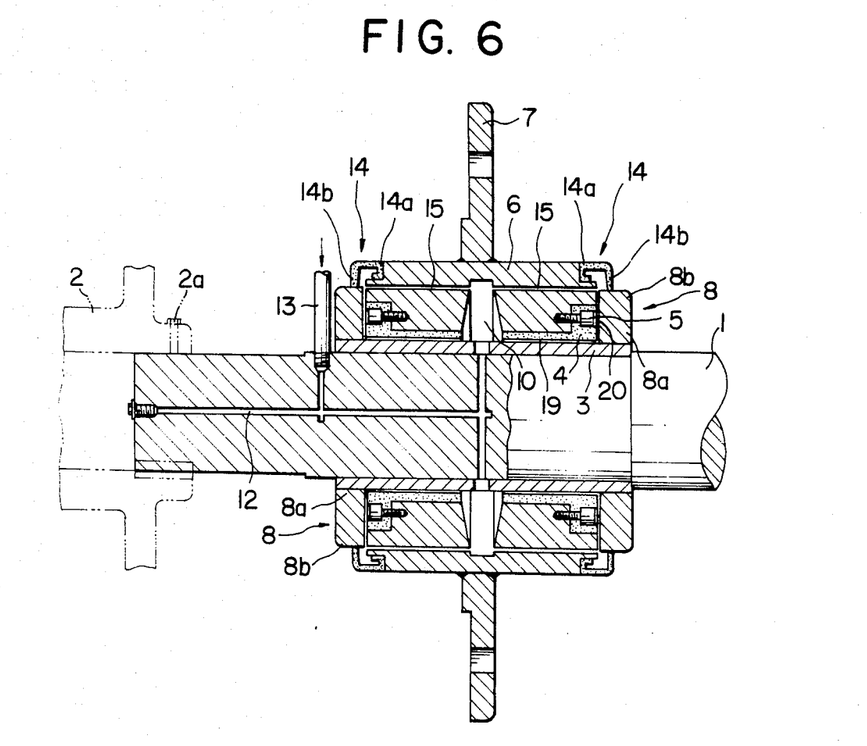
FIG. 6 is a sectional view of an underwater bearing protection device of the forth embodiment according to the present invention.

FIG. 6 shows a sectional view of the forth embodiment of an underwater bearing protection device of the present invention. and since the same numerals in FIG. 6 denote similar parts as in FIG. 5, a detailed explanation of these constitutions is omitted. The bases 14a of the seal members 14 are fixed to the step portion 6a and lips 14b are contacted with the edges 8d of the collars 8.

In the embodiments shown in FIGS. 5 and 6, because the diameters of the collars 8 are same as or smaller than the diameter of the hub 6, the whole of the underwater bearing protection device may be made compact. Because the O-ring 9 is not used, the mechanical abrasion between the O rings 9 and the outside of the hub 6 is prevented and therefore the flange 7 is rotated at high speed.

Because the O rings 9 are not used, the sealing action in this bearing may be lowered. However, this defect is removed by increasing the amount of clean water.

Figure 7:
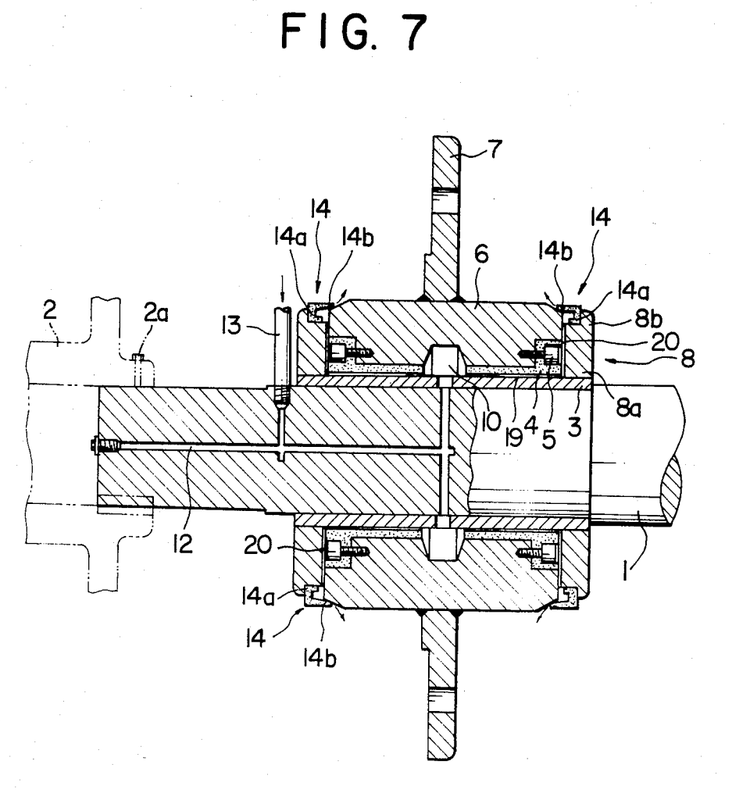
FIG. 7 is a sectional view of an underwater bearing protection device of the fifth embodiment according to the present invention.

FIG. 7 shows a sectional view of the fifth embodiment of an underwater bearing protection device of the present invention. In FIG. 7, 1 denotes a fixed shaft, 2 a shaft coupling, 3 a sleeve, 4 a bushing, 5 screws, 6 a hub, 7 a flange, 8 collars, 9 O rings, 10 a ring-like hole, 12 a center water supplying passage, 13 a water pipe, 14 sealing members, 15 water supply passages, 16 clean water pressure portions and 19 and 20 art gaps and since the same numerals denote similar parts as in FIG. 5, a detailed explanation of these elements is omitted. In the fifth embodiment, the water supplying passages 15 are not formed and the whole clean water is supplied to the clean water pressure portions 16 through gaps 19 and 20.

In this embodiment, because the water passages 15 are not formed in the hub 6, the design of the underwater bearing protection device in this embodiment is simpler than the embodiment of FIG. 5. Because the whole clean water is passed through the gaps 19 and 20, the lubrication between the collars 8 and the sides of the hub 6 and the bushing 4 and between the sleeve 3 and bushing 4 is improved and the sealing effect is increased. In the present embodiment, because the clean water is passed to the narrow spaces, the flow resistance in the passage to the clean water pressure portions 16 from the gaps 19 becomes large. This can be solved by making the pressure for sending the clean water large.

Figure 8:
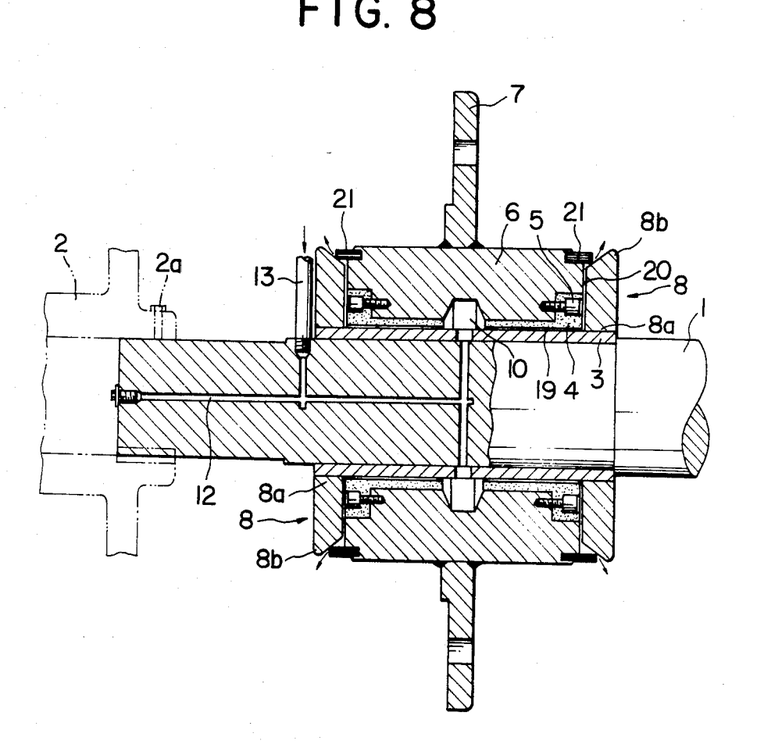
FIG. 8 is a sectional view of an underwater bearing protection device of the sixth embodiment according to the present invention.
Figure 9:
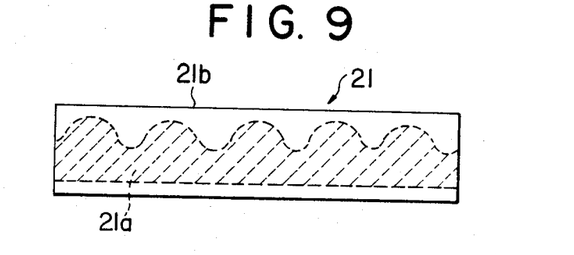
FIG. 9 is a plane view of a tape of a seal member according to the present invention.

FIG. 8 shows a sectional view of the sixth embodiment of an underwater bearing protection device of the present invention. Since the same numerals denote similar parts as in FIG. 7, the detailed explanation of these constitutions is omitted. In the present embodiment, seal members are formed by stacking a plurality of tapes and one side of the stacked tapes are attached to the hub 6. As shown in FIG. 9, tapes 21 have a resilient core 21a formed in only the base thereof and is not formed in a lip 21b thereof. When the clean water is gushed from the clean water pressure portions 16, the lip 21b is easily opened. When circularly forming this tape 21, the tapes 21 are respectively bent by the step portions in the both side of the hub 6 and the both edges of the tapes 21 are stacked and attached to each other.

The underwater bearing protection device according to the present embodiment may be provided with a dividing type underwater bearing in which the rotatable shaft is divided two sections by a plane passing through the center of the shaft.

Figure 10:
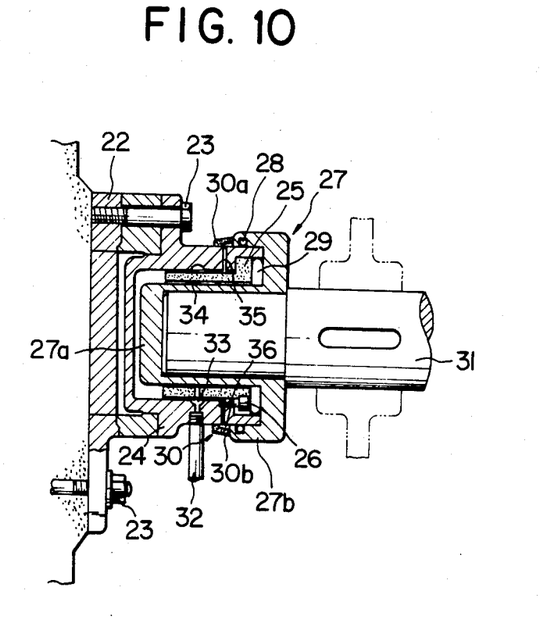
FIG. 10 is a sectional view of an underwater bearing protection device of the seventh embodiment according to the present invention.

FIG. 10 shows a sectional view of the seventh embodiment of an underwater bearing protection device of the present invention. This embodiment is different from the above first to sixth embodiments and the shaft is rotated. In FIG. 10, hub 24 is fixed to a body 22 by a screw 23 and a bushing 25 is fixed inside the hub 24 by a screw 26. A collar 27 has a cylinder portion 27b which protrudes into the bushing 25 and the outside edge 27 which is covered by the outside of the edge of the hub 24. An O ring 28 is attached between the outside of the hub 24 and the inside of the outside edge of the collar 27. A thrust needle bearing 29 is attached between the collar 27 and the side of the bushing 25. A seal member 30 has a base 30a fixed to the hub 24 and a lip 30b is contacted with the outside edge of the collar 27. One edge of a rotational shaft 31 is fixed into the cylinder portion 27b of the collar 27. A water pipe 32 is attached to the outside the hub 24 and is connected to a ring-like hole 33 which is formed in a contact portion between the hub 24 and the bushing 25 by a water passage. Clean water is passed through a gap 34 between the hub 24 and bushing 25 from the ring-like hole 33 and is supplied to a clean water pressure portion 36 which is surrounded by the seal member 30 through a longitudinal water passage 35 from the gap 34.

In equipment having a rotational shaft as shown in FIG. 10, the invasion of sand and mire between the bushing 25 and the cylinder portion 27a of the collar 27 is prevented by the seal member 30.

Figure 11:
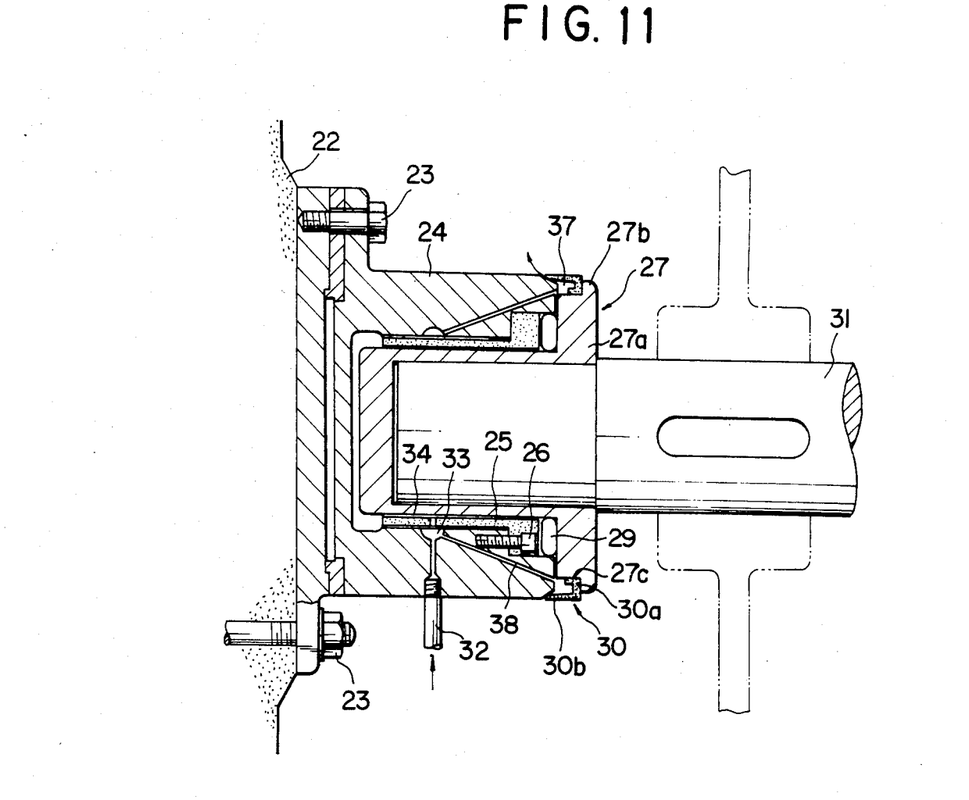
FIG. 11 is a sectional view of an underwater bearing protection device of the eighth embodiment according to the present invention.

FIG. 11 shows a sectional view of the eighth embodiment of an underwater bearing protection device of the present invention. In FIG. 11, 22 denotes a body, 23 a screw, 24 a hub, 25 a bushing, 26 screws, 29 a thrust needle bearing, 31 a rotational shaft, 32 a water pipe, 33 a ring-like hole, 34 a gap, and since the same numerals denote similar parts as in FIG. 10, a detailed explanation of these elements is omitted. In the embodiment, the diameter of the outside edge 27b of the collar 27 is same as or smaller than the hub 24; the base 30a of the seal member 30 is attached to the step portion 27c of the outside edge 27b of the collar 27 and the lip 30b is contacted with the outside of the hub 24. The clean water is supplied to the clean water pressure portion 37 which is surrounded by the seal member 30 through an inclined water supplying passage 38 from the ring-like hole 30.

Figure 12:
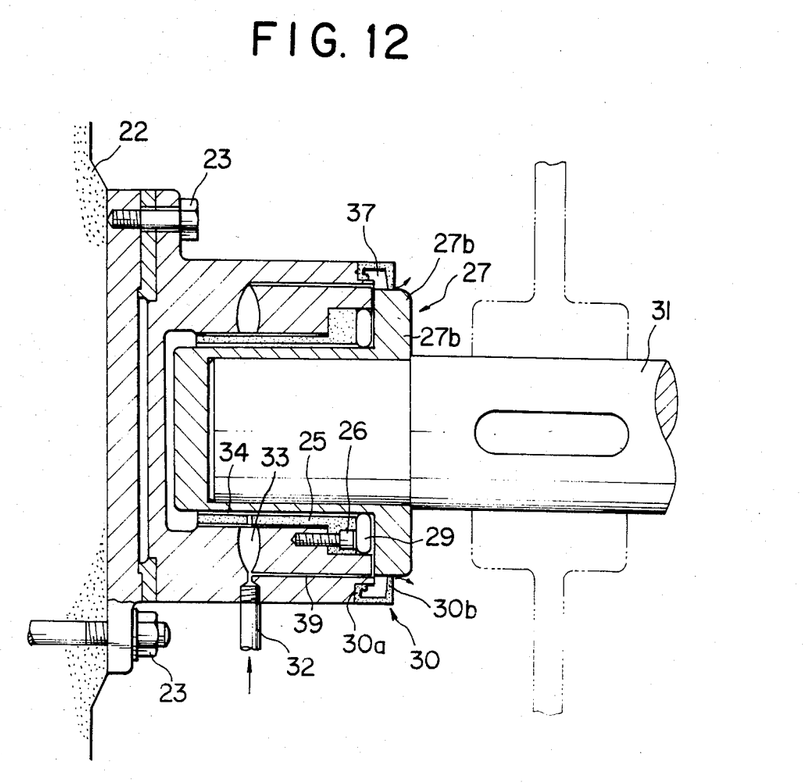
FIG. 12 is a sectional view of an underwater bearing protection device of the ninth embodiment according to the present invention.

FIG. 12 shows a sectional view of the ninth embodiment of an underwater bearing protection device of the present invention. Since the same numerals denote similar parts as in FIG. 11, a detailed explanation of these elements is omitted. In this embodiment, the base 30a of the seal member 30 is attached to the outside of hub 24 and the lip 30b is contacted to the outside edge 27b of the collar 27. The clean water is passed through the lateral water passage 39 which is formed in the hub 24 from the ring-like hole 33 and is supplied to the clean water pressure portion 37 which is surrounded by the seal member 30 through the gap between the bush 25 and the cylinder portion 27a of the collar 27 and the gap between the outside edge 27b and the thrust needle bearing 29 and the hub 24 from the lateral water passage 39.

As stated above, in the present invention, the seal member or members are mounted between the hub and the collar or collars and the clean water is supplied to the clean water pressure portion or portions which are surrounded by the seal member or members and is gushed between the lip or lips of the seal member or members and the outside of the hub or the outside edge or edges of the collar or collars. Therefore, the quick abrasion of a bearing is prevented in all equipment having a fixed shaft or a rotation shaft.

What is claimed is:

1. An underwater bearing protection device comprising:
   a fixed shaft,
   a sleeve attached on the said fixed shaft,
   a bushing rotatably mounted on said sleeve, a hub fixed around the outside of the bushing,
   collars having inside edges attached on said sleeve and outside edges respectively covering the both sides of said hub, and sealing members having bases attached on the both edges of said hub or the outside edges of said collars and lips respectively contacted to the outside edges of said collars or the both edges of the hub,
   whereby clean water is supplied to a ring-like hole formed in the bushing and hub through a center water supplying passage formed in the center of said fixed shaft and a water passage of said sleeve from a water pipe attached outside said fixed shaft and is supplied to clean water pressure portions between said sealing members and the both edges of the hub and said outside edges of said collars through water passages formed in the hub or gaps between said sleeve and said bushing and between said collars and bushing from said ring-like hole.

2. An underwater bearing protection device as set forth in claim 1 wherein the outside edges of said collars are respectively covered the both outside of said hub.

3. An underwater bearing protection device as set forth in claim 1 wherein the diameter of said collar is the same as or smaller than that of said hub.

4. An underwater bearing protection device as set forth in claims 2 or 3 wherein O rings are mounted between the outside edges of said collars and the outside of said hub.

5. An underwater bearing protection device as set forth in claim 1 wherein said sealing member is made of a resilient material.

6. An underwater bearing protection device as set forth in claim 5 wherein said resilient material is a rubber or plastic material.

7. An underwater bearing protection device as set forth in claim 1 wherein a reinforcement is buried in the base of said sealing member.

8. An underwater bearing protection device as set forth in claim 1 wherein a reinforcement is attached to the side of the base of said sealing member.

9. An underwater bearing protection device as set forth in claim 1 wherein said sealing member is made of stacked tapes having a core in one side.

10. An underwater bearing protection device as set forth claim 1 wherein said sealing member a tape having a resilient covering member is changed a form thereof by water pressure and a core formed inside said covering member.

11. An underwater bearing protection device comprising
a hub attached to a body,
a bushing attached inside said hub,
a collar having a cylinder portion rotationaly attached to the said bushing and an outside edge prvoided with the opening portion of said cylinder portion and covered the sides of said hub and said bushing,
a thrust needle bearing mounted between said outside edge and the side of said bushing,
a rotational shaft, one end of which is fixed into said cylinder portion, and
a sealing member having a base attached to the outside of said hub or the outside edge of said collar and a lip which is contacted with the outside edge of said collar or the outside of said hub, whereby clean water is passaged through a ring-like hole formed in said hub from a water pipe attached to the hub, and is supplied to a clean water pressure portion between said sealing member and the outside of said hub and the outside edge of said collar through a water passage formed on said hub or a gap between said bushing and the cylinder portion of said collar from said ring-like hole.

12. An underwater bearing protection device as set forth in claim 11 wherein the outside edge of said collar is covered by the outside of said hub.

13. An underwater bearing protection device as set forth in claim 12 wherein an O ring is mounted between the outside edge of said collar and the outside of said hub.

14. An underwater bearing protection device as set forth in claim 11 wherein the diameter of said collar is same as or smaller than that of said hub.

15. An underwater bearing protection device as set forth in claim 11 wherein said sealing member is made of a resilient material.

16. An underwater bearing protection device as set forth in claim 15 wherein said resilient material is of rubber or plastic.

17. An underwater bearing protection device as set forth in claim 11 wherein a reinforcement member is buried in the base of said seal member.

18. An underwater bearing protection device as set forth in claim 11 wherein a reinforcement member is attached to the side of the base of said sealing member.

19. An underwater bearing protection device as set forth in claim 11 wherein said sealing member is made of stacked tapes having a core in one side.

20. An underwater bearing protection device as set forth claim 11 wherein said sealing member a tape having a resilient covering member changed a form thereof by water pressure and a core formed on the inside of said covering member.

21. An underwater bearing protection device as set forth in claim 4 wherein O rings are mounted between the outside edges of said collars and the outside of said hub.

* * * * *